(12) United States Patent
Gopinath

(10) Patent No.: US 8,983,366 B2
(45) Date of Patent: Mar. 17, 2015

(54) METHODS AND SYSTEMS FOR MEDIA SYSTEM USE

(75) Inventor: Sreejit Gopinath, Karnataka (IN)

(73) Assignee: Harman International Industries, Inc., Stamford, CT (US)

( * ) Notice: Subject to any disclaimer, the term of this patent is extended or adjusted under 35 U.S.C. 154(b) by 193 days.

(21) Appl. No.: 13/537,982

(22) Filed: Jun. 29, 2012

(65) Prior Publication Data

US 2014/0004787 A1 Jan. 2, 2014

(51) Int. Cl.
  *H04W 88/00* (2009.01)
  *H04L 29/08* (2006.01)
  *H04W 4/04* (2009.01)

(52) U.S. Cl.
  CPC ............. *H04L 67/32* (2013.01); *H04W 4/046* (2013.01)
  USPC ...... 455/3.06; 455/3.01; 455/414.3; 455/420; 455/41.3; 725/40

(58) Field of Classification Search
  CPC ....... H04L 67/22; H04L 67/306; H04L 4/046; H04L 67/28; H04L 67/30; H04L 67/303; H04L 67/32; H04L 67/322; H04L 67/325; H04L 67/327; H04L 2209/50; H04L 2209/601; H04L 2209/603
  USPC ........... 455/3.06, 3.01, 518, 414.1, 344, 66.1, 455/557, 403; 707/104.1; 705/10, 14.73; 348/149, 143; 715/835, 853, 740; 381/186, 86; 701/36, 213, 211; 725/58, 725/32; 361/684
  See application file for complete search history.

(56) References Cited

U.S. PATENT DOCUMENTS

| | | | | |
|---|---|---|---|---|
| 5,283,639 | A  * | 2/1994 | Esch et al. | 725/32 |
| 7,787,818 | B2 * | 8/2010 | Shapiro et al. | 455/3.01 |
| 8,059,830 | B1 * | 11/2011 | Gleason et al. | 381/86 |
| 2002/0164973 | A1 * | 11/2002 | Janik et al. | 455/403 |
| 2005/0281414 | A1 * | 12/2005 | Simon et al. | 381/86 |
| 2006/0123053 | A1 * | 6/2006 | Scannell, Jr. | 707/104.1 |
| 2006/0259908 | A1 | 11/2006 | Bayer | |
| 2007/0139878 | A1 * | 6/2007 | Giffin et al. | 361/684 |
| 2008/0052744 | A1 * | 2/2008 | Hamasaka | 725/58 |
| 2008/0057929 | A1 | 3/2008 | Min | |
| 2008/0242221 | A1 * | 10/2008 | Shapiro et al. | 455/3.06 |
| 2009/0048908 | A1 * | 2/2009 | Kaplan et al. | 705/10 |
| 2011/0261202 | A1 * | 10/2011 | Goldstein | 348/149 |
| 2012/0088477 | A1 * | 4/2012 | Cassidy | 455/414.1 |
| 2012/0110511 | A1 * | 5/2012 | Howard | 715/835 |
| 2012/0180083 | A1 * | 7/2012 | Marcus | 725/32 |
| 2013/0122955 | A1 * | 5/2013 | Brewer et al. | 455/518 |
| 2013/0347038 | A1 * | 12/2013 | Lee | 725/40 |
| 2014/0033059 | A1 * | 1/2014 | Schubert et al. | 715/740 |
| 2014/0074630 | A1 * | 3/2014 | Singer et al. | 705/14.73 |
| 2014/0100740 | A1 * | 4/2014 | Chutorash et al. | 701/36 |

OTHER PUBLICATIONS

European Search Report—Nov. 11, 2013.

* cited by examiner

*Primary Examiner* — Tan Trinh
(74) *Attorney, Agent, or Firm* — Dalpreet Saluja

(57) ABSTRACT

Various embodiments relate to scheduling one or more media system for use. The media systems may or may not be in a vehicle. Input may be received at a computing device for scheduling use of multiple media systems. A schedule of media system use may be generated based on the input at the computing device. Use instructions based on the media system use schedule may be transmitted so that use of the multiple media systems is enabled in accordance with the media system use schedule.

25 Claims, 4 Drawing Sheets

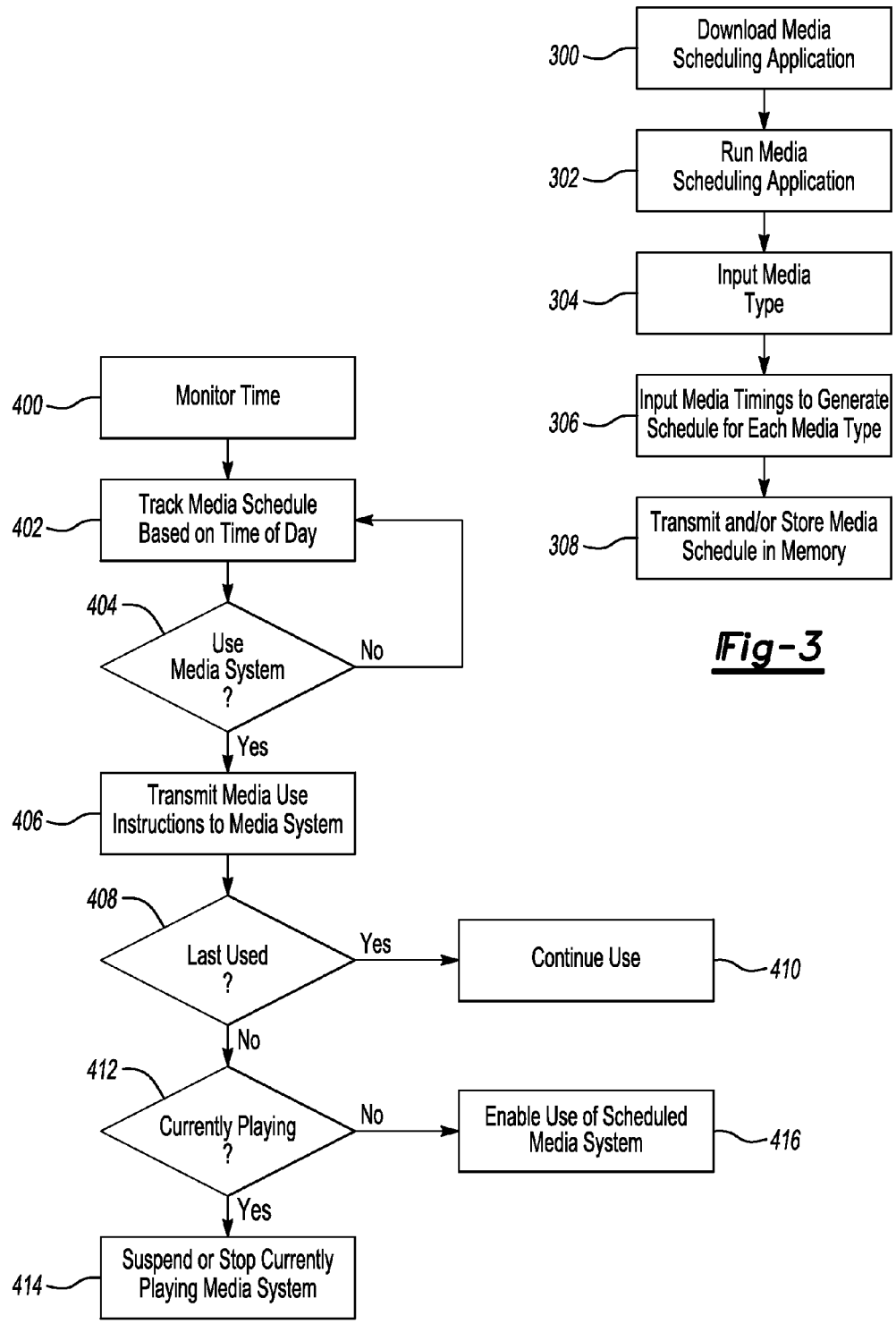

METHODS AND SYSTEMS FOR MEDIA SYSTEM USE

TECHNICAL FIELD

Various embodiments relate to playing media from one or more media systems. In some embodiments, the one or more media systems are in a vehicle. In some embodiments, the media systems play media based on one or more play schedules.

BACKGROUND

In modern vehicles, particularly with the increased availability of infotainment systems in vehicles, vehicle users have a number of media systems at their disposal. These media systems may be factory installed and/or may be a vehicle user's personal system and connected through connections provided in the vehicle. These connections can be wired or wireless connections. Further, vehicle users have multiple ways to listen to media. For example, the media can be listened to directly from the source (e.g., an am/fm radio or satellite radio), via streaming media from an in-vehicle device, and/or via streaming from a remote system (e.g., over the Internet).

Various examples exist of systems which are capable of providing media content in a vehicle. As one example, U.S. Pat. No. 7,200,357 to Janik et al. describes an automotive storage and playback device and method for using the same. An automotive storage and playback device and method for using the same are described. The automotive storage and playback device is capable of being detachably coupled to an automobile. The device includes a wireless transceiver to receive compressed digital content automatically from a computer system via a wireless local area network based on user defined preferences input into the computer system. The wireless transceiver is communicably coupled to the wireless local area network when the wireless transceiver is a predetermined distance from a wireless local area network access point. The device also includes a decoder and converter to decompress and convert the digital content. The decompressed and converted digital content is sent to be played on an output device in the automobile.

Outside of the vehicle environment, there are also many options from which to play media. Increasingly, many of these systems have wireless capability for communicating with other devices.

SUMMARY

One aspect relates to a computer-implemented method for using one or more media systems. According to the method, an input at a user device may be received for scheduling use of multiple media systems. The multiple media systems may be in a vehicle. A schedule of media system is generated at the user device use based on the input. Use instructions based on the media system use schedule may be transmitted so that use of the multiple media systems is enabled in accordance with the media system use schedule.

In some embodiments, data representing the schedule of media system use generated at the user device may be transmitted to a media system control module. The media system control module may store the schedule of media system use and transmit the use instructions to at least one media system of the multiple media systems based on the media system use schedule. In some embodiments, the media system control module may be a vehicle head unit. In other embodiments, the media system control module may be a consumer device.

In some embodiments, the use instructions may enable an automatic change to another media system of the multiple media systems based on the media system use schedule. The multiple media systems may include a radio (am/fm), satellite radio, a personal media player, a CD player, a DVD player, and the like.

In some embodiments, the schedule may include timings for playing specific media from the multiple media systems.

In some embodiments, the method may also include monitoring a period of time in order to instruct a media system change based on the media system use schedule. Upon a passage of the period of time, a media system change may be instructed.

Another aspect relates to a vehicle system for scheduling media system use. The system may include a vehicle computer, e.g., (and without limitation) a head unit. The vehicle computer may be configured to receive information establishing a schedule for using multiple media systems in a vehicle. The schedule may be stored in memory. A clock, such as (and without limitation) a vehicle clock, GPS clock, or satellite clock, may be monitored to determine when to transmit use instructions for at least one media system in the vehicle. The use instructions may be according to the media system use schedule. The use instructions may be transmitted based on the media system use schedule and a clock status to one or more of the multiple media system. Use of the multiple media systems may be enabled in accordance with the media system use schedule.

In some embodiments, the vehicle computer is further configured to receive user input at the vehicle computer defining a selection of the multiple media systems and the use schedule for the multiple media systems. The information received at the vehicle computer may includes the selection of the multiple media system and the user defined use schedule. Based on the information, the media system use schedule may be generated. The selection of multiple media system may be selected from a menu of standard media systems available in the vehicle.

In some embodiments, the vehicle computer may establish a connection with a user device. The information establishing the schedule may be received from the user device communicating with the vehicle computer.

In some embodiments, the use instructions may include instructions for changing from one media system to another media system.

In some embodiments, the vehicle computer may be further configured to determine, based on the clock and the media system use schedule, whether use of a currently used media system is complete. Instructions to suspend further use to the currently used media may be transmitted if use is complete.

In some embodiments, usage of one or more of the multiple media systems may be tracked. Based on the usage, use of at least one of the multiple media systems may be recommended. Additionally or alternatively, when one or more of the multiple media systems are used may be stored in memory. Based on the timing information and the media system use schedule, a determination may be made if a scheduled media system is the same as the media system previously used at the same time. If not the same, a recommendation may be output to include the media system previously used at the same time.

Another aspect relates to a system for scheduling media system use in which the at least one computer is configured to receive information establishing a schedule for using multiple media systems in a vehicle. Usage characteristics of one or more media systems may be stored. A clock may be monitored to determine when to transmit use instructions for at least one media system in the vehicle. The monitoring may be performed according to the media system use schedule.

Based on the media system use schedule, the usage characteristics, and the clock, the computer may determine if a change to the media system use schedule is recommended. If recommended, a recommendation is output for a change to the media system use schedule. If the recommendation is accepted, the media system use schedule may be modified based on the recommendation. Media system use instructions based on the modified media system use schedule may be transmitted to one or more of the multiple media systems. Use of the multiple media systems may be enabled in accordance with the modified media system use schedule. The usage characteristic may include, but is not limited to, a frequency of use and/or a time of usage.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

FIG. 3 illustrates an operation for scheduling media system use;

FIG. 4 illustrates an operation for enabling use of one or more media systems based on a media system use schedule;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Additionally, the disclosure and arrangement of the figures is non-limiting. Accordingly, the disclosure and arrangement of the figures may be modified or re-arranged to best fit a particular implementation of the various embodiments of the invention.

As often happens, a user may desire to listen to media from different media systems and at different times of the day. Further, the media systems may be in different locations such as in a home and in a vehicle. For example, a user may desire to listen to music in the morning from a CD player at home. On the commute to work, the user may desire to listen to the news on satellite radio in a vehicle. After the news program is over, the user may like to switch to a connected media player. On the commute home, the vehicle user may want to listen to the traffic report, which is reported at a specific time, and then sports from the analog (am/fm) radio. Inconveniently, the vehicle user has to manually switch to each of these different media systems.

Figure 1:
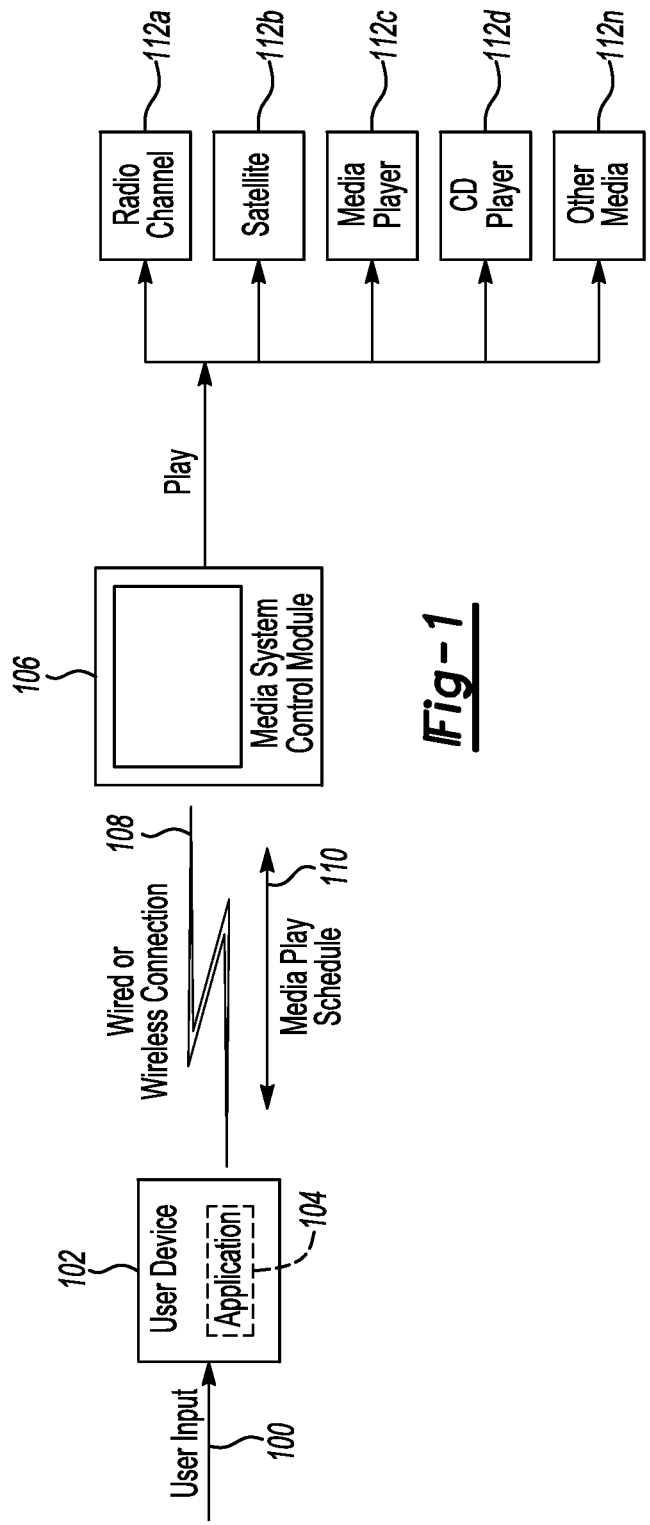
FIG. 1 is a block diagram illustrating the system and operation of a media system scheduling system.

FIG. 1 illustrates a media system scheduling system for enabling use of the media systems based on the schedule. Using a user device 102, a user may input 100 one or more schedules for use of one or more media systems. The user device may or may not be portable. Non-limiting examples of a user device 102 may be a mobile phone, a tablet, a laptop, a personal media player, a desktop computer, or the like. The schedule(s) may be based on clock time and/or time periods. On the user device, a software application 104 may be stored which, when run from the user device 102, may provide an interface for enabling the user, from the user device 102, to input a schedule for utilizing the one or more media systems (described in further detail below). The schedule defines when a media system is switched for another and/or made active for use by the user.

The user device 102 may communicate with a media system control module 106 via a wired or wireless connection 108. The wireless connection may include, but is not limited to, BLUETOOTH, WiFi, WiMax, other communication using the 802.11 standard, near field communication (NFC), and the like. The application 104, via the user device 102, may transmit 110 the media system use schedule to the media system control module 106 over the wired or wireless connection 108. Alternatively or additionally, instructions may be transmitted from the user device 102 to the module 106 for enabling use of the one or more media systems based on the schedule.

The media system control module 106 may be a hardware device having memory and wired or wireless communication capability for communicating with the user device 102 and the one or more media systems. The media system control module 106 may transmit instructions to the media system(s) for enabling media system use based on the schedule and/or instructions output by the application 104 and transmitted by the user device 102. In some embodiments, the instructions may be output by a client software application (not shown) stored and running on the module 106 and transmitted to the media system(s) via the module 106.

The media system control module 106 may be a vehicle device or a consumer device. As a consumer device, the module 106 may function with home consumer media systems. As a vehicle device, the module 106 may be factory installed or an aftermarket device functioning with vehicle media systems. In some embodiments, the module 106 may be a vehicle head unit or vehicle computing system. Further details of using the media system scheduler in a vehicle are described with respect to FIG. 2.

The module 106 transmits instructions 114 to one or more media systems 112a, 112b, 112c, 112d . . . 112n (generally referred to herein by referenced number "112) based on the schedule defined by the user. Non-limiting examples of media systems may include, but are not limited to, radio (am/fm) 112a, satellite 112b, personal media player 112c, a CD player 112d, and others 112n. In some embodiments, the schedule may define timings for specific aspects of a media system. For example, the schedule may define channels on the analog radio 112a or satellite radio 112b, tracks on a CD in a CD player 112d (e.g., track 5), and/or genres, artists, tracks, or playlists on a personal media player 112c.

In some embodiments, the user device 102 may directly communicate with the media systems without the module 106 as an intermediary. A wireless connection may be established between the user device 102 and the media systems 112 for enabling control and scheduling use of one or more media systems. In alternative embodiments, the module 106 may serve as the user device 102.

Figure 2:
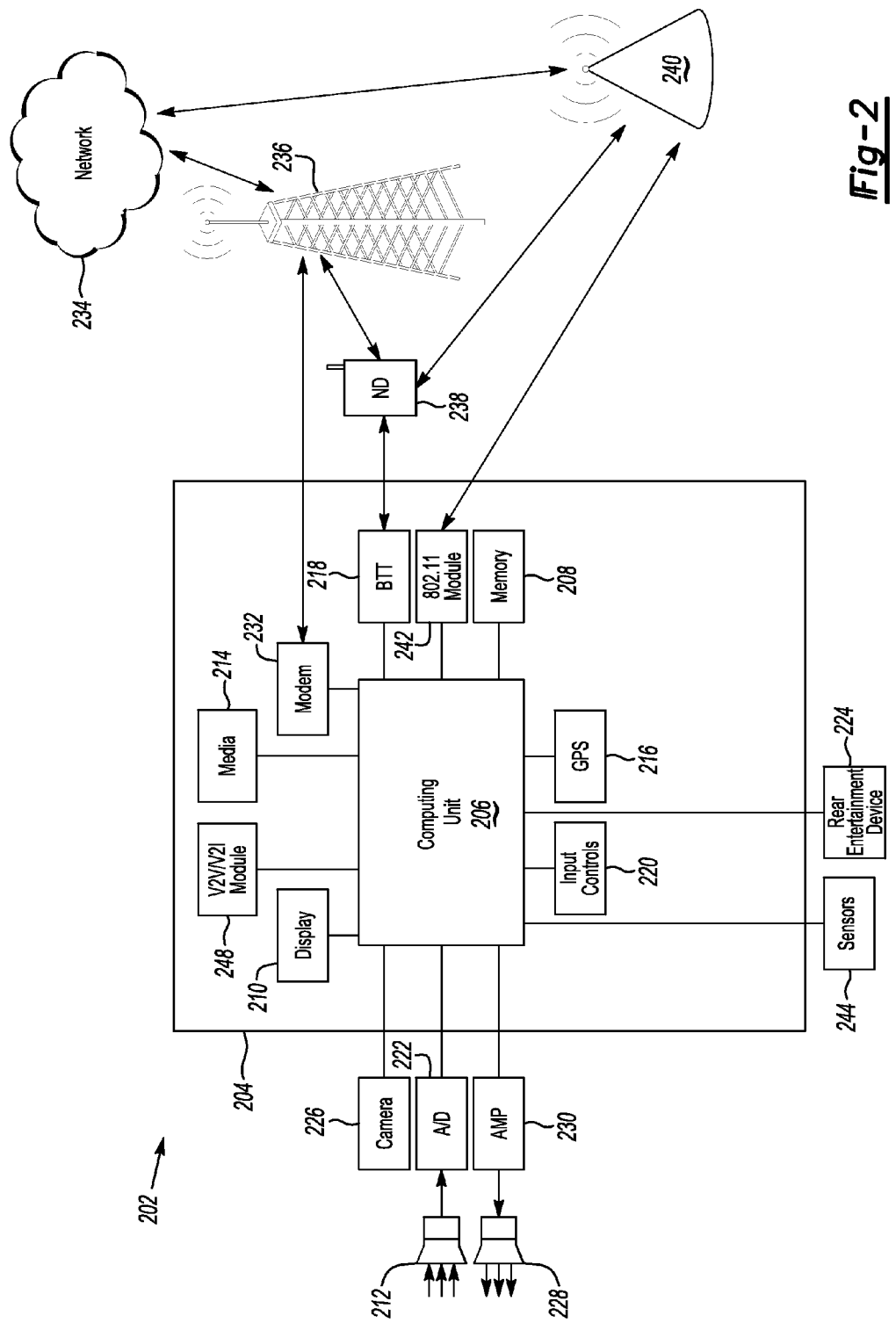
FIG. 2 is a block diagram illustrating the system topology of a vehicle infotainment system (VIS) for use with the media system scheduling system.

The media system scheduling system may be used in a vehicle having a vehicle infotainment (or other computing) system as well. FIG. 2 is a block diagram of a vehicle computing system (VCS) 202. Within the vehicle, a head unit 204 may have a computing unit 206 having one or more processors (not shown) that provide for on-board processing of instructions and controls received by the VCS 202. Data that may be received and processed by the processor 206 may be stored in memory 208. The memory 208 may include non-persistent or volatile memory, such as (and without limitation) random access memory (RAM), and persistent or non-volatile memory, such as (and without limitation) a hard disk drive (HDD) or flash memory.

The head unit 204 may also include a visual front end interface, such as a display 210, located in the vehicle. The display 210 may be an LCD display or a graphical display. In some embodiments, the interface may have a touch sensitive screen. In additional or alternative embodiments, the interaction with the VCS 202 may occur through, button presses, audible speech and/or speech synthesis and displayed on display 210.

The VCS 202 is also provided with a number of different modules through which the user can interface or interact with the VCS 202. For example, the vehicle may be provided with a microphone 212, one or more media components 214 (e.g., and without limitation, one or more input modules, such as, and without limitation, an auxiliary input or USB input for connected devices, a radio, a CD/DVD player, satellite radio, and the like), a GPS module 216, and a BLUETOOTH module 218. Additional media components may include one or more rear entertainment devices 224. The rear entertainment device 224 may include one or more media players (e.g., a DVD player) and one or more displays visible to rear seat passengers from which video, picture and/or audio may be output.

The computing unit 206 may be in communication with a vehicle network (not shown) that communicates data to and from the various modules. Non-limiting examples of a vehicle network include an SAE J1850 bus, a CAN bus, a GMLAN bus, and any other like vehicle data buses. The vehicle network may additionally or alternatively be a network for use with infotainment systems such as a media oriented system transport (MOST), Ethernet, or an Audio-Video Bridge (AVB) network.

Additional modules of the VCS 202 may include one or more vehicle cameras 226. The vehicle cameras 226 may be front or rear view cameras and/or in the vehicle. For purposes of simplicity, a single camera 226 is shown at the front of the vehicle. The output of the camera(s) 226 may be presented on the display 210 and/or on one or more rear-entertainment devices 226.

One or more input controls 220 may also be provided to allow a user to swap between and activate various modules. Signals passing from the microphone 220 may pass through one or more analog-to-digital converters 222 before being passed to the processor 206 and vice-versa. Additionally, signals to and from some media components 214 (e.g., AM/FM radio) may also pass through one or more A/D converters 222 before being passed to or from the processor 206.

For purposes of simplicity, one A/D converter 222 is shown. However, multiple A/D converters 222 may be arranged in the system 202.

The output from one or more vehicle modules of the VCS 202 may be audible and/or visual output. Audible output may be output from one or more in-vehicle speakers 228. The speaker(s) 228 may be connected to an amplifier 230 and may receive its signal from the processor 206. In some cases, the signals may pass through a digital-to-analog (D/A) converter (not shown). Visual outputs may be output on the display 210 and/or on one or more rear entertainment devices 224.

The vehicle 10 may include an on-board modem 232 for two-way communication of data and messages between the vehicle and an external network 234. As a non-limiting example, modem 232 may be a USB cellular modem. As an alternative example, the modem may be an embedded modem in the vehicle. The data and messages may be exchanged by communicating with the one or more cellular towers 236.

Alternatively, via a BLUETOOTH transceiver 218 in the vehicle, a communication or pairing may be made automatically with a user's portable (sometimes referred to as "nomadic") device 238 (e.g., mobile phone, smart phone, PDA, or any other device having wireless remote network connectivity) after a vehicle key-on. In some embodiments, pairing the portable device 238 and the BLUETOOTH transceiver 218 may be instructed through one or more buttons or similar input (not shown). The one or more buttons may be one or more hard keys located in the vicinity of the vehicle driver (e.g., and without limitation, on the steering wheel, in the center console, or near the display 210) and/or one or more soft keys shown on the display 18. The soft keys may or may not be touch-sensitive (e.g, on a touchscreen display). Additionally or alternatively, the soft keys may be one or more physical buttons mapped to the one or more soft keys.

In yet an alternative embodiment, connectivity may be accomplished using a USB connection linking the nomadic device 238 with the head unit 204 via a USB module. In some embodiments, this connection may only be enabled using an accessory protocol. Non-limiting examples of accessory protocols include the IPHONE accessory protocol or the ANDROID accessory protocol.

Using the portable device 238, communication with an external network 234 may be accomplished through, for example, communication with a cellular tower 236 and/or a wireless access point 240. Data may be communicated from the vehicle (e.g., from the processor 206) to the network 234 utilizing, for example, a data-plan, data over voice, or DTMF tones associated with nomadic device 54.

Additionally or alternatively, the vehicle may be outfitted with one or more wireless modules 242 for wireless communication with the network 234. A non-limiting example of such a wireless communication is any communication system meeting the 802.11 IEEE standard such as WiFi or WiMax. To communicate with the network 234, a connection may be made to a wireless hotspot 240 (or wireless access point) which may be outside and remote from the vehicle (e.g., and without limitation, at a publically available hotspot venue). In some embodiments, a wireless hotspot may be created in the vehicle and communication with the network 234 may be accomplished by wirelessly connecting one or more compatible devices in the vehicle with the in-vehicle wireless access point. For purposes of simplicity and clarity, FIG. 2 shows an external hotspot 240.

The processor 206 may be provided with an operating system including an API to communicate with modem application software. The modem application software may access an embedded module or firmware on the BLUETOOTH transceiver 218 to complete wireless communication with a remote BLUETOOTH transceiver (such as that found in a nomadic device).

The nomadic device 238 may be capable of voice band and/or broadband data communication. A user may be able to transfer data over the voice band using a technique called frequency division multiplexing. Thus, a user of the nomadic device 238 may be able to talk over the device while data is being transferred. If the user has a dataplan associated with the nomadic device 238, broadband transmission may be possible.

Incoming data to the VCS 202 may be passed through the nomadic device 238 via a data-over-voice or data plan through the onboard BLUETOOTH transceiver 218 and into the vehicle's internal processor 206. Alternatively, the data may be passed through the embedded modem 232 via cellular communication to the processor 206. Alternatively, the data may be passed through the wireless module 242 via, e.g., a WiFi connection, to the processor 206. Data may be stored in the memory 208 of the VCS 202.

Additional sources that may interface with the VCS 202 may include personal navigation device, vehicle navigation device, onboard GPS devices, or remote navigation systems having connectivity to network 234. Further, the processor 206 could be in communication with a variety of other auxiliary devices connected through a wireless or wired connection. Auxiliary devices may include, but are not limited to, personal media players, wireless health devices, portable computers, and the like.

Additionally communicating with the computing unit 206 may be one or more interior sensors 244a, 244b . . . 244n (generally referred to herein as interior sensors 244) and one or more exterior sensors 246a, 246b . . . 246n (generally referred to herein as exterior sensors 246). Interior sensors 244 may monitor one or more vehicle components for vehicle concerns. Exterior sensors 246 may monitor events outside of the vehicle. As one non-limiting example, exterior sensors 246 may be proximity sensors for detecting objects near the vehicle.

FIG. 3 illustrates a process for creating and/or updating schedules for using one or more media system 112. A software application for scheduling media system use may be downloaded and/or installed on to the user device 102 (block 300). Once stored on the user device 102, the application 104 may be loaded and run from the user device 102 (block 302).

Using the software application, a user may set and store one or more schedules for using one or more media systems. The media system scheduling application 104 may have an interface through which a user may input one or more media systems 112 desired to be used (block 304). In some embodiments, the interface may be a graphical user interface (GUI). The user may select the media system from a list or menu of media systems. Additionally or alternatively, the user may input media items to play from the media system. The inputs may include, but are not limited to, preset radio channels, channel station numbers, track numbers, playlists, song names, In some embodiments, where the scheduling system is used in a vehicle, the user may input identifying information about the vehicle (e.g., a VIN # and/or model, make, and year) to the application 104. Based on the information on the identified vehicle which, in some embodiments, may be obtained from Internet based sources, the media systems in the vehicle may be presented to the user. The information may be based on standard media systems available in the vehicle. The user may select the media systems for scheduling from the media systems presented. In some instances, the user may input and schedule additional media systems if, for example, non-standard equipment (e.g., customizations) was installed in the vehicle. In some embodiments, the user does not need to enter identifying information about the vehicle and the media system in the vehicle may be presented. This may be the case, for example, where the user is scheduling media system use from the vehicle head unit 204.

Additionally, the user may input when each media system is desired to be used (block 306). The schedule may be based on specific clock times (e.g., 12 or 24 hour clock) and/or periods of time (e.g., switch to another media system after "X" minutes or hours). When the schedule(s) for the media system(s) 112 are set by the user, the schedule(s) may be stored in memory of the user device 102 and/or transmitted to and stored in memory of the media system control module 106 (block 308).

FIG. 4 illustrates a process for using one or more media system 112 based on the media system schedule. The operation described in FIG. 4 is applicable with or without the use of the media system control module 106. For purposes of simplicity, the operation of the system is described with use of the module 106 (as shown in FIG. 1).

Time may be monitored to determine the time of day and/or the amount of time that has elapsed (block 400). The time may be monitored by the module 106, a client application (not shown) running on the module 106, using a system clock which may be a vehicle clock, a GPS clock, a satellite clock, or another clock from which time can be monitored. Alternatively, the time may be monitored by the user device 102, via the scheduling application 104, using a clock on the user device 102. The monitoring is based on the schedule created by user via the scheduling application 104.

The media system use schedule may be tracked for determining when one or more of the media systems 112 may be used or when a change to another media system is to occur (block 402). As a non-limiting example, the schedule may be tracked by determining the scheduled use time for a media system 112 and determining the time on the monitored clock. When the monitored time and the scheduled time correspond, instructions are output for enabling media system use. As another non-limiting example, in accordance with the schedule use time, it may be determined when to enable use of the next media system based on when a previous media system was used.

If the time monitoring is performed at the user device 102, the tracking may occur at the user device 102. One or more messages may be output and transmitted from the user device 102 to the module 106 instructing use of the media system(s) 112. Based on the instructions, the client application on the module 106 may output instructions for enabling media system(s) 112 use based on the scheduled time. If the monitoring is performed at the module 106, the schedule may be output from the application 104 and transmitted from the user device 102. For example, the schedule may be transmitted to the module 106 after a connection is established between the user device 102 and the module 106. The schedule may be transmitted in response to manual input or automatically. The schedule may be stored on the module 106 and the tracking may occur at the module 106. The client application on the module 106 may output instructions for enabling media system(s) 112 use based on the scheduled time. In some embodiments, the monitoring and/or tracking may occur at the user device 102 and the module 106.

It may be determined if use of a media system 112 is requested based on the scheduled use time (block 404). If not, scheduling tracking and time monitoring may continue (block 402). If use is instructed (block 404), instructions may be transmitted to the media system 112 for enabling use (block 406). Based on the instructions, the media system 112 may execute an action including, but not limited to, activation, switching to another media system may occur, changing a radio channel, or playing another track.

At times, media system use may be scheduled, but the media system was most recently used. For example, a vehicle user may have used the media player a day before during a vehicle journey. The user may schedule to play the same song or from the same playlist the next morning. A determination may be made whether the media system (or song, playlist, track, channel, etc.) requested/scheduled was last used or played (block 408). If so, use of the media system is continued (or playing the song, playlist, channel, track, etc. is continued) (block 410).

Based on the schedule, a media system change may occur (or a change of what's playing on the media system) while a media system is currently in use. For example, while using a personal media player, media system use may be changed to the radio. As another example, while listening to one radio channel, a change to another radio channel may occur. A determination may be made whether a media system is currently being used or playing (block 412). If so, the currently playing media system may be suspended or stopped (block 414) and the scheduled media system enabled for use (block 416). Otherwise, the scheduled media system may be enabled for use (block 416).

The operation described in FIG. 4 may be as long or as short as the user desires depending on the schedule created by the user. For example, the user may create a daily schedule of media system use. The schedule may alternatively be run for a shorter period of time or a longer period of time.

Figure 5:
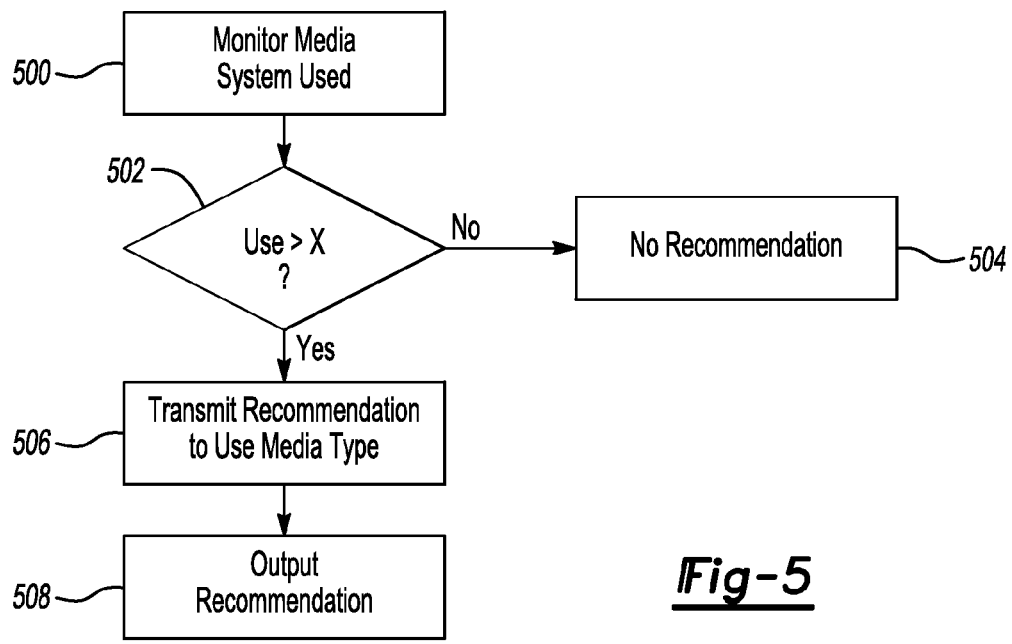
FIG. 5 illustrates an operation for recommending use of one or more media systems based on a frequency of utilizing one or more media systems.

In some embodiments, a media system may be recommended for use based on usage characteristics including, but not limited to, frequency of use and/or time of use, in addition to or as an alternative to the process described above. FIG. 5 illustrates an embodiment where a media system is recommended for use based on frequency of use.

The frequency of use for a media system is based on the media system used and how often it is used. To provide the recommendation, the type of media system used may be monitored (block 500). A determination may be made how often the media system is used (block 502) by tracking each use of a media system. The information may be stored in memory of the user device 102 and/or module 106. In some embodiments, a threshold use amount may be defined and, based on the threshold, it may be determined if the use is greater than the threshold, e.g., use >X. If the use is not greater, a recommendation is not provided (block 504). The process may be executed as described above.

If the use is greater than the threshold, a recommendation may be transmitted identifying the frequently used media system for output at the user device 102 or the module 106 (block 506). The recommendation may be output at the user device 102 or the module 106 audibly and/or visually (block 508).

Figure 6:
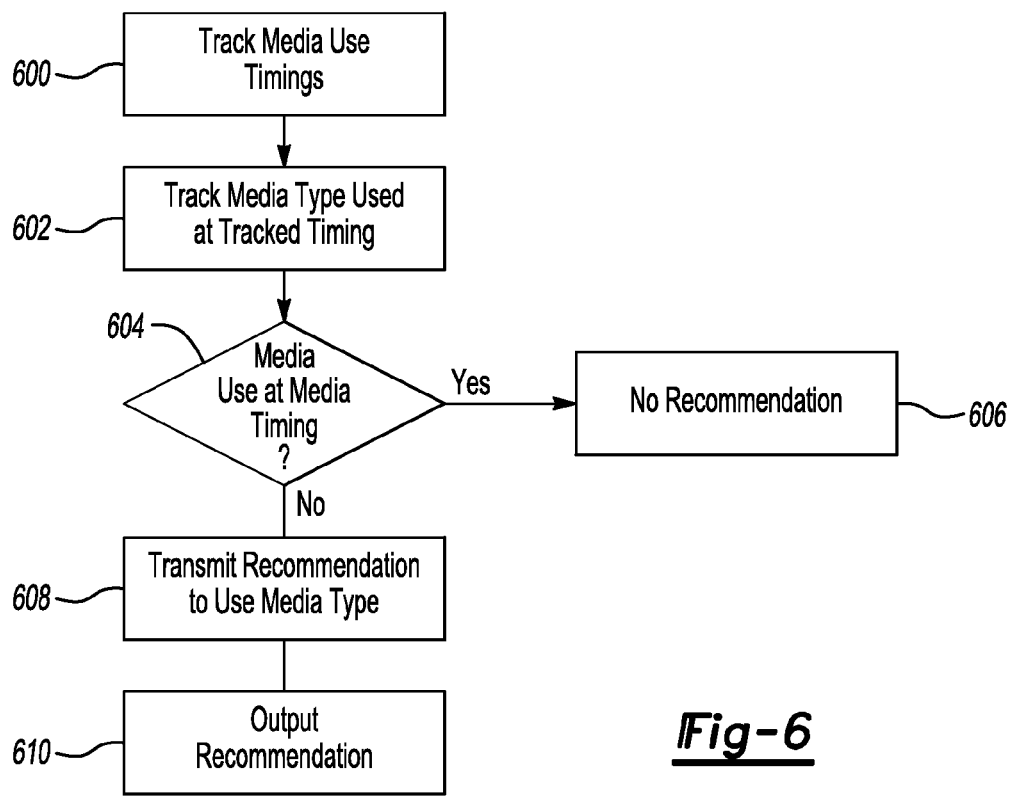
FIG. 6 illustrates an operation for recommending use of one or more media systems based on a time that the one or more media systems are used.

FIG. 6 illustrates an embodiment where a media system is recommended based on use of the system at a certain time of day or time period. For example, the user may listen to satellite radio, and further a specific station, at 8 AM every day. When one or more media systems are listen to may be tracked at the user device and/or module 106 (block 600). Further, which media system is being used and at what time may also be tracked (block 602). The information may be stored in memory of the user device 102 and/or module 106.

When a media system is being used, or is scheduled to be used, a determination may be made if the media system (or the scheduled media system) is the same as the media system regularly used during the scheduled time (block 604). In some embodiments, the determination may be made based a threshold use during the time period. The threshold use evaluation is described with respect to FIG. 5. If so, no recommendation is made (block 606).

If not, then a recommendation may be transmitted for output at the user device 102 and/or the module 106 identifying the media system historically used during the scheduled time (608). The recommendation may be output audibly and/or visually at the user device 102 and/or module 106 (block 610). In some embodiments, a recommendation may be made to rearrange the schedule in order to include the system(s) that have been historically used during the scheduled time.

When a recommendation is made, whether based on frequency, time, or both, the user may or may not implement the recommendation. In some embodiments, the default process may be that described in FIG. 4. If the user does not implement the recommendation, the process may be executed according to FIG. 4.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method for using one or more media systems, the computer-implemented method comprising:
   receiving input at a user device for generating a schedule to enable multiple media systems to playback media content:
   generating at the user device the schedule for the multiple media systems to playback media content; and
   transmitting over wired or wireless communication instructions based on the media system schedule, wherein at least one of the multiple media system is enabled in accordance with the media system schedule.

2. The computer-implemented method of claim 1 wherein the multiple media systems are in a vehicle.

3. The computer-implemented method of claim 1 further comprising transmitting data representing the schedule generated at the user device to a media system control module, wherein the media system control module stores the schedule and transmits the instructions to at least one media system of the multiple media systems based on the media system schedule.

4. The computer-implemented method of claim 3 wherein the media system control module is a vehicle head unit.

5. The computer-implemented method of claim 3 wherein the media system control module is a consumer device.

6. The computer-implemented method of claim 1 wherein the instructions enable an automatic change to at least one other media system of the multiple media systems based on the media system schedule.

7. The computer-implemented method of claim 1 wherein the multiple media systems include a radio (am/fm), satellite radio, a personal media player, and a CD player.

8. The computer-implemented method of claim 1 wherein the schedule includes timings for playing specific media from the multiple media systems.

9. The computer-implemented method of claim 1 further comprising:

monitoring a period of time in order to instruct a media system change based on the media system schedule; and
upon a passage of the period of time, instructing the media system change.

10. The computer-implemented method of claim 9 wherein monitoring includes monitoring at least one of a vehicle clock, a GPS clock, or a satellite clock.

11. A vehicle system for scheduling media system use, the system comprising:
a vehicle computer configured to:
receive information establishing a user defined schedule for multiple media systems in a vehicle to playback media contents;
store the schedule in memory;
monitor a clock signal to determine when to transmit instructions to at least one media system in the vehicle according to the media system schedule; and
transmit the instructions based on the media system schedule and a clock status based on the clock signal to one or more of the multiple media systems, wherein the at least one media system is enabled to playback content in accordance with the media system schedule.

12. The vehicle system of claim 11 wherein the vehicle is further configured to:
receive user input at the vehicle computer defining a selection of the multiple media systems;
receive user input at the vehicle computer defining the schedule for the multiple media systems, wherein the information includes the selection of the multiple media system and the user defined schedule; and
generate the media system schedule based on the information.

13. The vehicle system of claim 12 wherein the selection of multiple media system is selected from a menu of standard media systems available in the vehicle.

14. The vehicle system of claim 11 wherein the vehicle computer is further configured to establish a wired or wireless connection with a user device, wherein the information establishing the schedule is received from the user device.

15. The vehicle system of claim 11 wherein the instructions include instructions for changing from one media system to another media system.

16. The vehicle system of claim 11 wherein the clock signal is from at least one of a vehicle clock, a GPS clock, or a satellite clock.

17. The vehicle system of claim 11 wherein the vehicle computer is further configured to:
based on the clock signal and the media system schedule, determine if use of a currently used media system is completed; and
transmit suspending instructions to the currently used media if use is completed.

18. The vehicle system of claim 11 wherein the vehicle computer is further configured to:
track usage of one or more of the multiple media systems; and
recommend use of at least one of the multiple media systems based on the usage.

19. A vehicle system for scheduling media system use, the system comprising:
a vehicle computer configured to:
receive information establishing a schedule for enabling use of multiple media systems in a vehicle;
store the schedule in memory;
transmit use enabling instructions based on the media system schedule to one or more of the multiple media system, wherein use of the multiple media system is enabled in accordance with the media system schedule;
store in memory information as to when one or more of the multiple media systems were previously used;
based on the media system schedule, determine if a scheduled media system is the same as the media system previously used at a same time; and
if not the same, output a recommendation to include the previously used media system.

20. A system for scheduling media system use, the system comprising:
at least one computer configured to:
receive information establishing a schedule for using multiple media systems in a vehicle;
store usage characteristics of one or more media systems;
monitor a clock to determine when to transmit use instructions for at least one media system in the vehicle according to the media system use schedule;
based on the media system use schedule, the usage characteristics, and the clock, determine if a change to the media system use schedule is recommended;
if recommended, output a recommendation for a change to the media system use schedule;
if the recommendation is accepted, modify the media system use schedule based on the recommendation; and
transmit the use instructions based the modified media system use schedule to one or more of the multiple media systems, wherein use of the multiple media systems is enabled in accordance with the modified media system use schedule.

21. The system of claim 20 wherein the usage characteristic is a frequency of use.

22. The system of claim 20 wherein the usage characteristic is a time of usage.

23. The system of claim 20 wherein the use instructions including changing from one media system to another media system.

24. The system of claim 20 wherein the multiple media systems are in a vehicle.

25. The system of claim 20 wherein the at least one computer is a vehicle head unit.

* * * * *